United States Patent [19]
Rozman et al.

[11] Patent Number: 5,218,520

[45] Date of Patent: Jun. 8, 1993

[54] VSCF SYSTEM WITH REDUCED DC LINK RIPPLE

[76] Inventors: Gregory I. Rozman, 6248 Sawgrass Dr., Rockford, Ill. 61111; Alexander Cook, 219 Washington St., Rockford, Ill. 61104

[21] Appl. No.: 799,585

[22] Filed: Nov. 27, 1991

[51] Int. Cl.⁵ .............................................. H02M 1/14
[52] U.S. Cl. ........................................ 363/39; 363/40; 363/45; 307/105
[58] Field of Search .................. 363/35, 37, 39, 40, 363/41, 45, 46, 95, 96, 97, 98; 307/105

[56] References Cited

U.S. PATENT DOCUMENTS

| | | | |
|---|---|---|---|
| 2,629,014 | 2/1953 | Edwards | 178/44 |
| 3,628,057 | 12/1971 | Mueller | 307/105 |
| 3,825,815 | 7/1974 | Gyugyi et al. | 321/9 A |
| 4,382,275 | 5/1983 | Glennon | 363/41 |
| 4,519,022 | 5/1985 | Glennon | 363/41 |
| 4,527,226 | 7/1985 | Glennon | 363/41 |
| 4,595,976 | 6/1986 | Parro, II | 363/41 |
| 4,780,659 | 10/1988 | Bansal et al. | 322/58 |
| 4,788,653 | 11/1988 | Henderson et al. | 364/724.01 |
| 4,812,669 | 3/1989 | Takeda et al. | 307/105 |
| 4,835,411 | 5/1989 | Takeda | 307/105 |
| 4,855,664 | 8/1989 | Lane | 322/19 |
| 4,935,859 | 6/1990 | Kirchberg et al. | 363/39 |
| 4,935,860 | 6/1990 | Kirchberg et al. | 363/39 |
| 4,977,492 | 12/1990 | Kirchberg, Jr. et al. | 363/41 |
| 5,016,157 | 5/1991 | Rozman et al. | 363/39 |

Primary Examiner—Emanuel T. Voeltz
Attorney, Agent, or Firm—Marshall, O'Toole, Gerstein, Murray & Bicknell

[57] ABSTRACT

A circuit in a power system for suppressing an AC ripple superimposed on a bus signal on a bus includes a first circuit for producing first and second signals having a frequency substantially equal to the AC ripple frequency wherein the second signal is a phase quadrature of the first signal, a second circuit for combining these signals with a signal representing the bus signal having the AC ripple superimposed thereon so as to derive a control signal having substantially the same frequency and phase as the AC ripple, and a third circuit responsive to this control signal so as to substantially suppress the AC ripple on the bus.

36 Claims, 4 Drawing Sheets

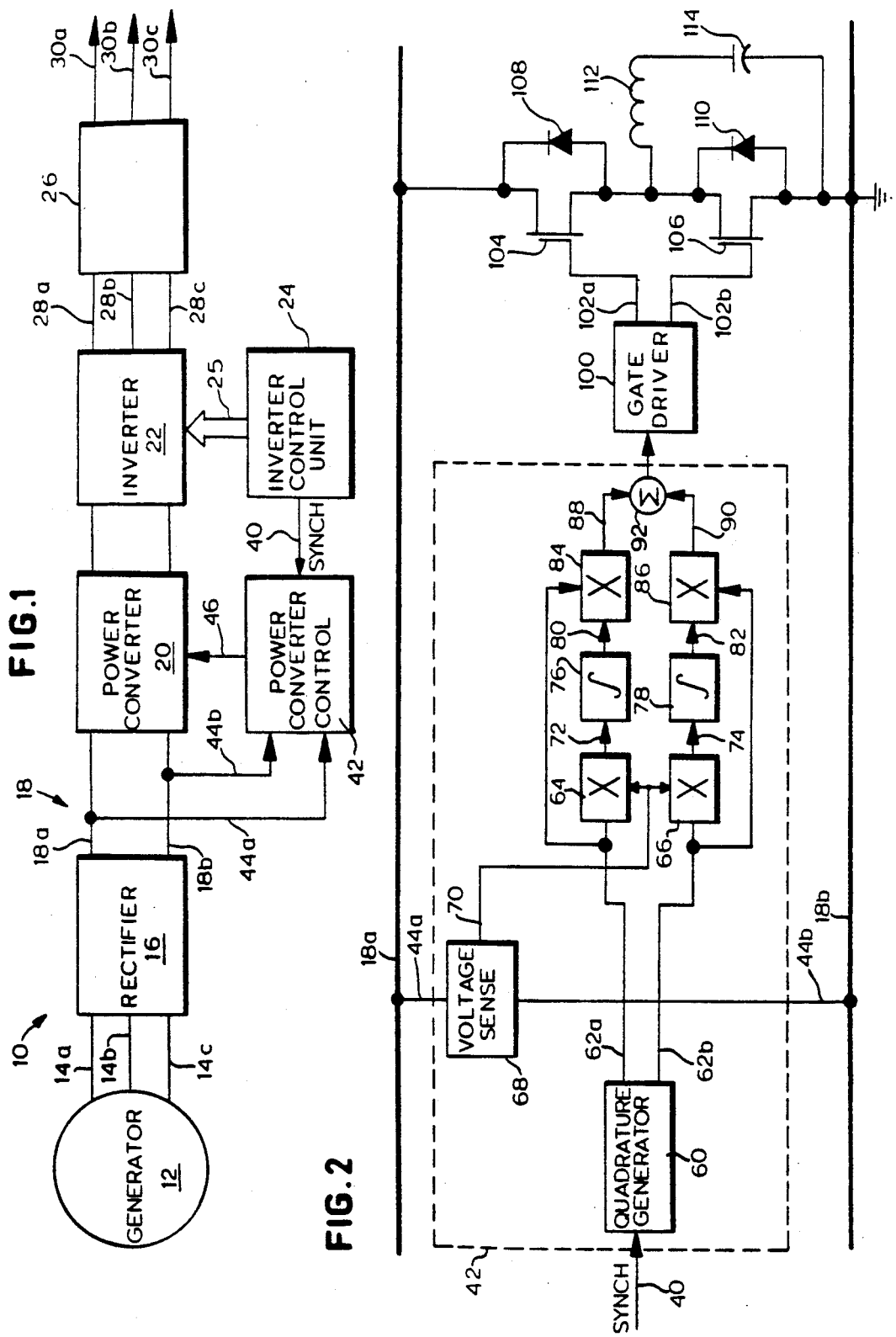

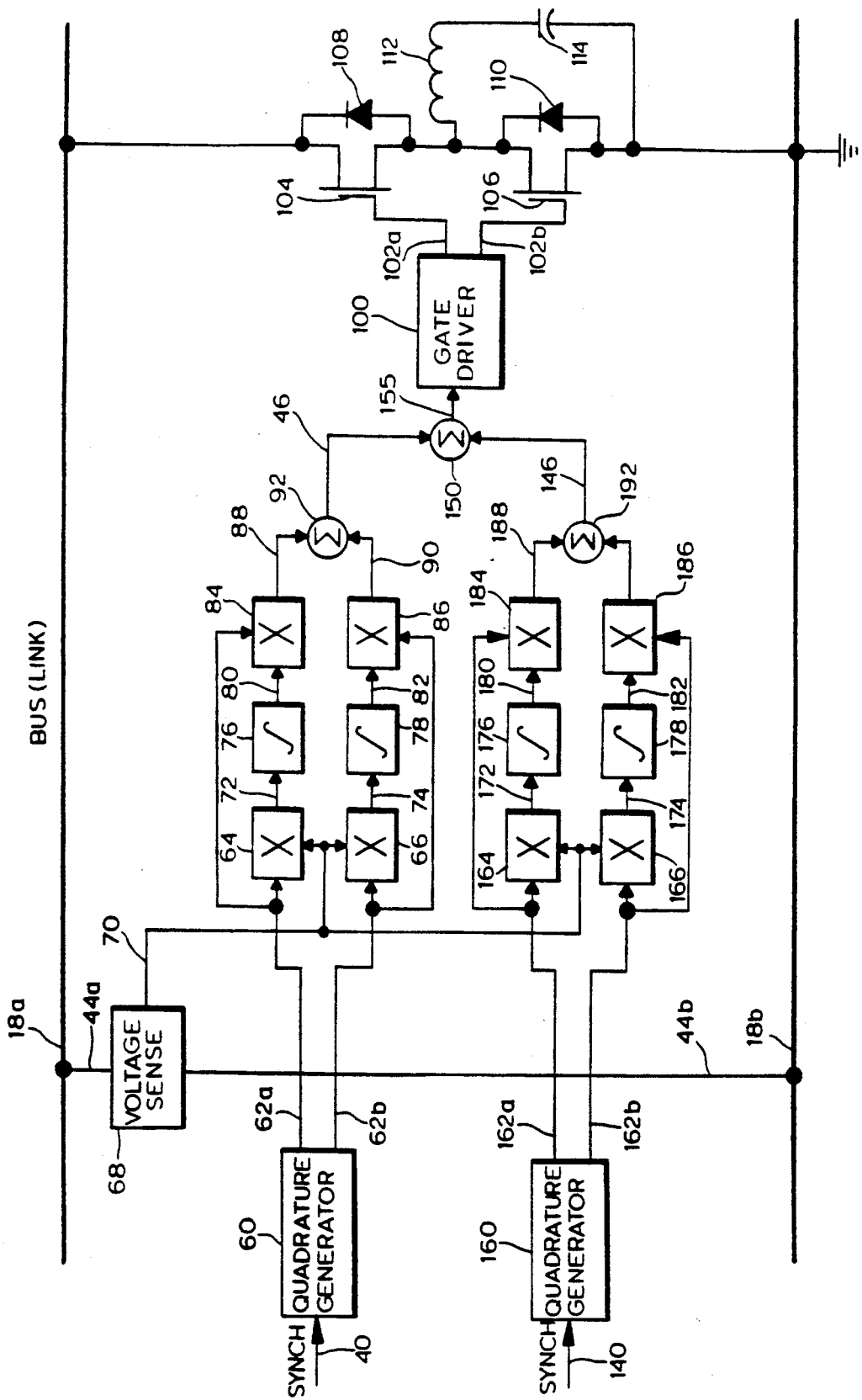

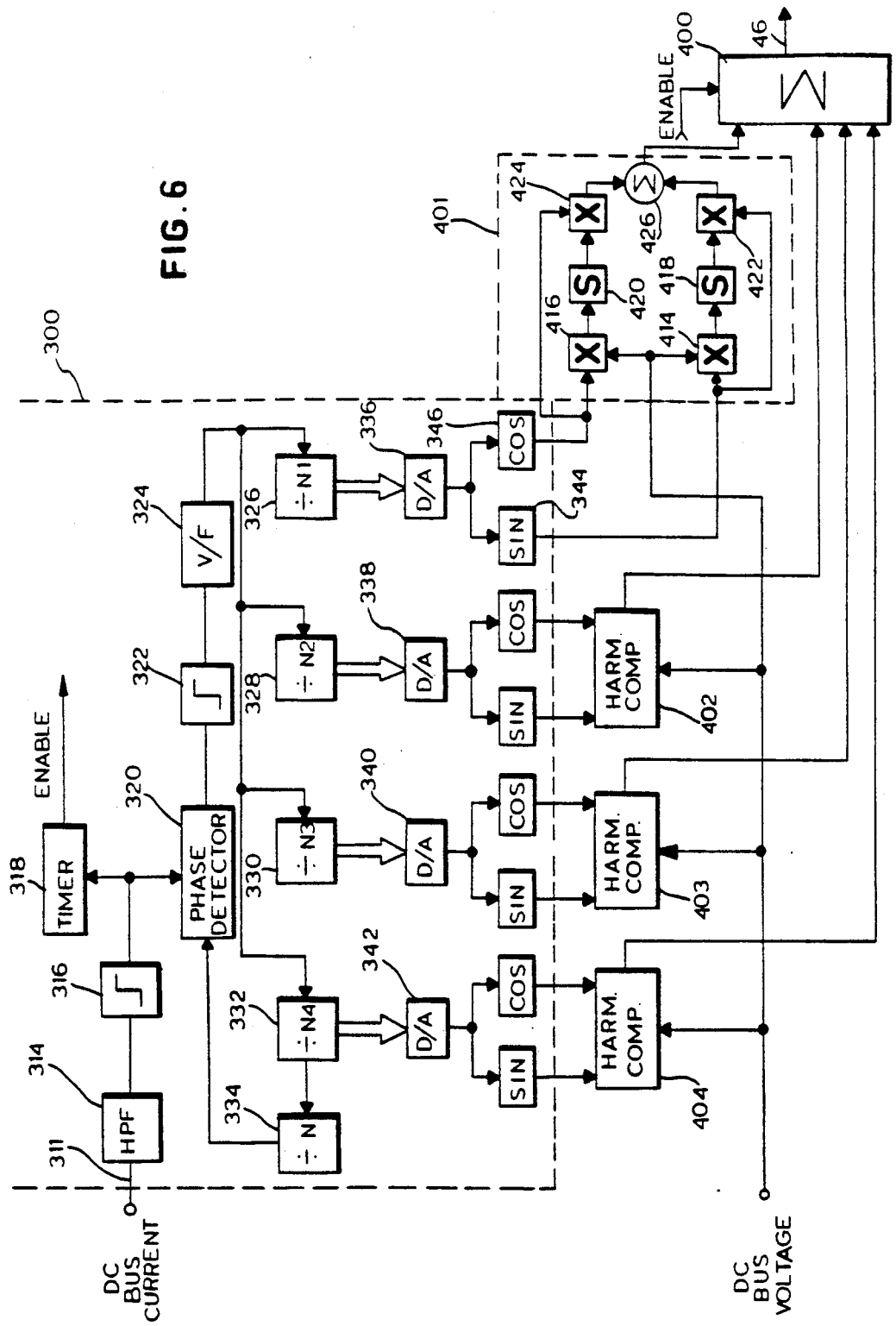

VSCF SYSTEM WITH REDUCED DC LINK RIPPLE

TECHNICAL FIELD

The present invention relates generally to a ripple suppression circuit, and more particularly to an AC ripple suppression circuit for substantially eliminating ripple in a DC signal on a bus of an invertor system.

BACKGROUND OF THE INVENTION

In numerous electrical power generating systems there is a need to eliminate undesired AC ripple signals coexisting with a desired signal on a bus. Typically these undesired AC ripple signals are generated by known system components such as power sources or are results of reflections caused by unbalanced loads. In either case, these undesired AC ripple signals are reflected throughout the circuitry of the system. This is particularly true in variable speed, constant frequency (VSCF) power generating systems, such as those typically used in aircraft.

In an ideal VSCF system, a prime mover turns a generator which typically produces a three-phase electrical signal, the instantaneous frequency of which is dependent upon the speed of the prime mover. A rectifier bridge then rectifies this three-phase, variable frequency signal to produce a substantially DC signal on a bus. Next, an invertor inverts the DC signal in response to a control signal to produce a three-phase AC signal. An output filter filters this three-phase AC signal to eliminate substantially all but the desired fundamental frequency thereby producing a constant frequency, three-phase signal at the power system output.

However, due to the complex nature of the loads typically connected to VSCF power systems, particularly those found in aircraft design, and due to the fact that these loads frequently change as a result of operator control actions, it is impossible to know the precise load factor connected to the power system at any particular time. This generally results in the loads being unbalanced with respect to the power generator for a majority of the loads.

Because of the unbalanced nature of the loads, AC ripple signals having frequencies corresponding to harmonics of the signals supplied by the invertor are reflected back through the power system and specifically onto the DC bus. Because of these AC ripple signals appearing on the DC bus, the invertor no longer receives a pure DC signal at its input, but instead receives a DC signal containing an AC ripple component. This AC ripple component causes the invertor to produce additional harmonics at its output.

One typical method of correcting for these AC ripple effects is through a feedback loop which samples the output of the power system to determine when phase and frequency errors appear. This feedback loop compares the system output with a reference signal to produce an error signal. This error signal then drives circuitry to compensate for the output distortion. One problem with such a feedback configuration is that distortion must appear on the power system output line before compensation for such distortion can occur. In other words, the compensation circuitry will always lag the distortion occurring at the power system output thus allowing some distortion to be transmitted to the load. Examples of compensation networks are shown in Kirchberg et al., U.S. Pat. No. 4,977,492 and Kirchberg et al., U.S. Pat. No. 4,994,956, both of which describe a feedback loop connected to the output of a VSCF power system for modulating the switching of the invertor so as to eliminate distortions produced by the invertor. One drawback of these systems is the high amount of computing power necessary for their operation.

Another well known method of eliminating ripple appearing on a bus is by connecting passive notch filters to the bus, with such filters being tuned to the specific frequencies that are expected to appear on the bus. However, because of the high power which generally exists on the DC bus in a VSCF power system, these passive notch filters are typically very heavy, require a substantial amount of space, and are intolerant to frequency shift.

A further method of eliminating undesired ripple on a bus is with the use of an active notch filter capable of changing its passband frequency over a limited range. Mueller, U.S. Pat. No. 3,628,057 shows one implementation of such a technique. Mueller describes a filter connected to a bus for eliminating undesired frequency components from the bus, with a correction circuit for controlling the center passband frequency of the filter so as to compensate for errors introduced by the filter circuitry or for shifts in the power source frequency.

Takeda et al., U.S. Pat. No. 4,812,669 shows the combined use of a passive filter and an active notch filter to eliminate AC ripple from a bus. The passive filter consists of a combination of inductors and capacitors while the active filter comprises a PWM controller which drives the operation of a network of transistors and diodes operating so as to eliminate undesired components of a signal existing on a bus.

SUMMARY OF THE INVENTION

It is the purpose of this invention to describe a ripple suppression device operating on a bus to substantially eliminate AC ripple signals appearing on the bus where said AC ripple signals have known frequencies.

It is further an object of this invention to describe an active notch filtering device capable of substantially eliminating distortion appearing in a power generating system before such distortion is the cause of further distortion in the output of the system.

It is also an object of this invention to provide a ripple suppression device capable of substantially eliminating ripples existing on a bus without the attendant weight and space requirements of simple passive filters.

It is still further an object of this invention to describe a device that is capable of simultaneously substantially eliminating AC ripple signals having different frequencies coexisting on a bus.

According to the present invention, the AC ripple signal on the bus is sensed. A first reference signal is provided having a frequency equal to the frequency of the ripple signal and a known reference phase and a second reference which is shifted from the first reference signal by 90° is also provided. These first and second reference signals are then separately combined with the sensed AC ripple to produce a control signal which is related in amplitude, phase and frequency to the AC ripple on the bus. A power converter uses this control signal to substantially eliminate the AC ripple signal existing on the bus.

BRIEF DESCRIPTION OF THE DRAWINGS

These and other features and advantages will become more apparent from a detailed consideration of the invention when taken in conjunction with the drawings in which:

FIG. 1 is a block diagram of the present invention when used in conjunction with a VSCF power conversion system for converting variable speed motive power into DC power and then into constant frequency, three-phase AC power;

FIG. 2 is a block diagram of the power converter shown in FIG. 1 along with a power converter control unit having a single channel for eliminating a single frequency AC ripple signal from a DC bus;

FIG. 3 is a block diagram of an alternative power converter along with a power converter control unit having two channels capable of eliminating two AC ripple signals having different frequencies from a DC bus;

FIG. 6 is a block diagram of the phase lock loop and power converter of FIGS. 4 and 5 used in conjunction with a multiple channel power converter control unit to eliminate multiple AC ripple signals.

DESCRIPTION OF THE PREFERRED EMBODIMENTS

Figure 4:
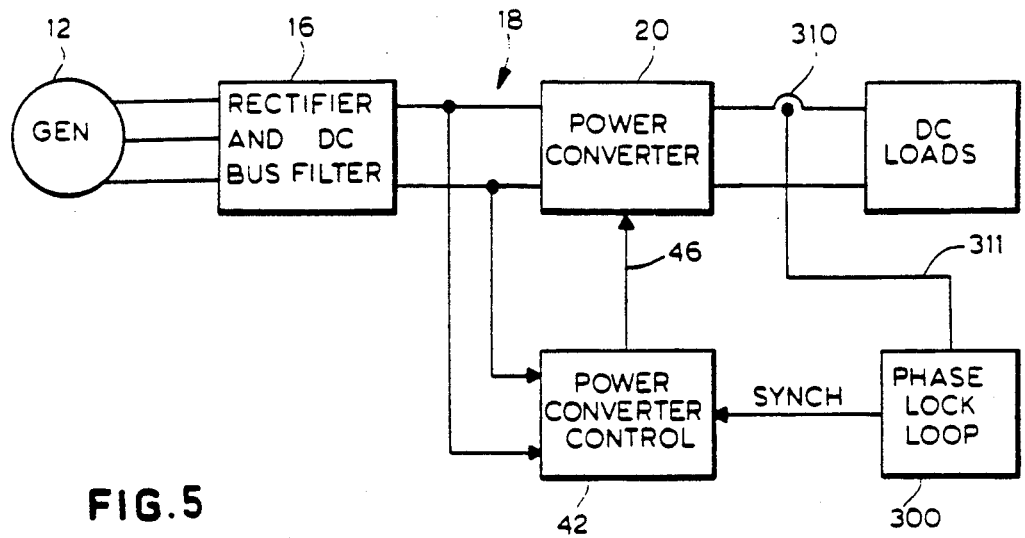
FIG. 4 is a block diagram of an embodiment of the present invention configured to eliminate load-induced AC ripple signals.

Referring now to FIG. 1, a variable speed constant frequency (VSCF) power system 10 is shown. A generator 12, powered by a prime mover, such as an aircraft jet engine (not shown in the Figure) produces a three-phase, variable frequency signal on lines 14a, 14b and 14c. Rectifier bridge 16, of the type generally known in the art, converts this variable frequency, three-phase AC signal into a DC signal on DC bus 18, having DC bus links 18a, 18b. Power converter 20, the operation of which is described in detail below, is connected to DC bus links 18a, 18b. Invertor 22 is connected to the DC bus 18 and inverts the DC voltage existing across bus links 18a, 18b in response to signals from the invertor control unit 24. Output filter 26 which is connected to invertor 22 through invertor output lines 28a, 28b, 28c produces a single frequency, three-phase AC voltage signal on the system output lines 30a, 30b and 30c.

The power converter control unit 42, the operation of which is described in detail below, is responsive to the voltage on DC links 18a and 18b via lines 44a, 44b, respectively, and to the reference synchronization signal on line 40. Power converter control unit 42 generates on line 46, a control signal for driving the power converter 20. Likewise, the invertor control unit 24 produces invertor control signals on bus 25 for controlling the operation of the invertor 22.

In the preferred embodiment, the switches of invertor 22 are pulse width modulated (PWM) to invert the DC voltage on the DC bus 18 into AC having a frequency determined according to the control signals produced by the invertor control. Invertor 22 and invertor control unit 24 may be, for example, of the type shown in U.S. Pat. No. 4,595,976. Invertor 22, by inverting the DC voltage on bus 18, produces at its outputs 28a, 28b, 28c a three-phase signal which may include harmonics of the fundamental frequency determined by invertor control unit 24.

The output filter 26 consists of three bandpass filters (not shown in the Figure) of the type generally known in the art. These filters are designed to eliminate the undesired harmonic components of the AC voltage on lines 28a, 28b, 28c thereby producing a single frequency, three-phase AC signal on system output lines 30a, 30b, 30c. Control unit 24 produces a known frequency reference synchronization signal on line 40 which is in phase with the output of invertor 22 and which the power converter control unit 42 uses to determine the control signal sent to power converter 20. This known frequency is the frequency of the ripple which is to be suppressed on the DC bus.

In operation, the generator 12 driven by a prime mover produces a three-phase, variable frequency voltage on lines 14a, 14b, 14c. Rectifier bridge 16 rectifies this three-phase voltage producing a substantially DC signal across the DC links 18a, 18b. The power converter 20 operates to eliminate any AC ripples appearing on the DC bus 18 in the manner described below. Invertor 22 then inverts the DC voltage across the DC links 18a, 18b in response to the control signals sent by the invertor control unit 24, producing a three-phase output on lines 28a, 28b and 28c. The output filter 26 filters this signal to produce a substantially single frequency, three-phase signal on system output lines 30a, 30b and 30c.

When the VSCF system 10 is connected to an unbalanced load through its output lines 30a, 30b, and 30c, AC ripple is generated, such as by the invertor 22, and will be reflected back through invertor 22 to the DC bus 18. This ripple will have a frequency which is known and which usually is a harmonic of the fundamental frequency of the invertor 22 output.

Ripple appearing on the DC bus causes invertor 22 to distort its output on lines 28a, 28b and 28c by producing additional harmonics. The purpose of the power converter 20 and power converter control unit 42 is to detect and substantially eliminate this AC ripple existing on the DC bus 18 so that invertor 22 does not produce additional harmonics on its output lines 28a, 28b, 28c which may be outside of the filtering capabilities of filter 26. This enables the VSCF power system to produce a low harmonic content, substantially single frequency, three-phase AC signal, even when attached to an unbalanced load.

As shown in FIG. 2, power converter control unit 42 is shown connected to bus links 18a, 18b through lines 44a and 44b, respectively. The power converter control unit 42 receives as an input the synchronization signal of known frequency reference and fixed phase (which is assumed to be O) produced on line 40 by control unit 24 (not shown in FIG. 2). Since the ripple frequency is a predictable harmonic of the invertor fundamental frequency, the frequency of the synch signal is also a multiple of the fundamental frequency. This synchronization signal is input to a quadrature generator 60 which produces on lines 62a, 62b, in-phase and phase quadrature components respectively of the harmonic to be eliminated. The in-phase reference is essentially a sinusoidal signal having the same frequency as the AC ripple on bus 18. The quadrature reference is essentially a cosinusoidal signal having the same frequency as the in-phase reference. Voltage sensor 68 connected between lines 44a and 44b produces on its output line 70, a signal indicative of the voltage existing between the bus links 18a and 18b. The signal on line 70 has two components, the DC level supplied by rectifier 16 and the AC ripple reflected back through invertor 22.

The power converter control unit 42 at this point splits into two paths. In the first path the in-phase component of the reference signal existing on line 62a is input to the first input port of multiplier 64 while the voltage produced by voltage sensor 68 on line 70 is input to the second input port of multiplier 64. Multiplier 64 then multiplies the signals on lines 62a and 70 placing the result on line 72. This signal contains a DC component reflecting the amplitude and phase of the selected AC ripple and is fed into the conditioning unit 76.

The purpose of the conditioning unit 76 is to eliminate all AC components from the signal on line 72 leaving only the DC component reflecting the phase and amplitude of the AC ripple. It is a further purpose of the conditioning unit 76 to enhance this component to a desired amplitude level. In the preferred embodiment conditioning unit 76 comprises an integrator. However it should be noted that conditioning unit 76 along with conditioning unit 78 could also comprise a low pass filter followed by a proportional integrator unit.

Conditioning unit 76 produces its output on line 80 which feeds the first input port of multiplier 84. Multiplier 84 takes as its second input the in-phase component of the reference synchronization signal on line 62a.

Likewise in the second path the phase quadrature component of the reference signal existing on line 62b is input into the first input port of multiplier 66, while the voltage produced by the voltage sensor 68 is input into second input port of multiplier 66 which in turn produces its output signal on line 74. Similar to the first path, the signal on line 74 enters conditioning unit 78, the purpose of which is to eliminate all AC components of the output of multiplier 66 and enhance the amplitude level of the desired signal. The conditioning unit 78 produces its output, which is a DC signal reflecting the conditioned amplitude and phase of the AC ripple on the DC link, on line 82. The signal on line 80 is essentially the DC component of the product of the amplitude of the AC ripple and the sine of the AC ripple phase. Likewise, the signal on line 82 is essentially the DC component of the product of the amplitude of the AC ripple and the cosine of the AC ripple phase. Taken together, these two DC components form a vector representing the AC ripple. The signal on line 82 is then entered into the first input port of multiplier 86. The phase quadrature component of the reference signal existing on line 62b feeds the second input port of multiplier 86 which in turn produces its output on line 90. Summer 92 combines the signals existing on lines 88 and 90 producing a single control signal which is equal in frequency, and related in phase and amplitude to the undesired ripple signal existing on the DC bus. The output of summer 92 is placed on line 46 and serves as an input signal to the power converter 20.

The power converter 20 forms a means for producing a waveform that is substantially similar to the control signal existing on line 46 but having enough power to substantially eliminate the AC ripple existing on the DC bus. The power converter 20 accomplishes this through the use of a controlling means for controlling a pair of switches which in turn regulate energy flow between the DC bus 18 and a means for alternatively absorbing energy from the positive half cycle of the AC ripple on DC bus 18 and delivering this energy to the negative half cycle of the AC ripple on DC bus 18 which thus flattens (suppresses) the AC ripple.

Accordingly, power converter 20 includes gate driver 100 which accepts the control signal from line 46 as its input. The gate driver 100, which is well known in the art and is essentially a PWM generator, produces output control signals on lines 102a and 102b which connect to the input gates of IGBTs 104 and 106, respectively. It should be noted that when used to suppress a single frequency AC ripple the gate driver 100 should have a square root function preceding the PWM generator. The square root function is needed in this situation to suppress harmonics of the fundamental frequency normally produced when canceling a single frequency signal. Although any appropriate gate drive circuit may be used for gate driver 100, circuit IR 2110, by way of example only, may be used.

IGBTs 104 and 106 act as switches, switching on and off in response to the control signals on lines 102a and 102b. When gate driver 100 produces a control signal of sufficient voltage on line 102a or 102b, IGBT 104 or 106 correspondingly, receives that voltage signal at its gate and goes into saturation mode thereby acting substantially as a short circuit. If, however, the control signal on line 102a or 102b is not of sufficient voltage, then the corresponding IGBT 104 or 106 will prevent current flow between its source and its drain thereby acting as an open circuit.

Diodes 108 and 110 are connected across respective IGBTs 104 and 106 to provide a conduction path while the current is flowing in the reverse direction relative to the IGBTs' short circuit flow path. IGBTs 104 and 106 are connected in a series fashion across bus links 18a and 18b.

An inductor 112 and capacitor 114 connected in a series configuration as shown in FIG. 2, act as an energy storage device capable of alternately absorbing energy from DC bus 18 during the positive half cycle of the AC ripple and delivering the stored energy back to DC bus 18 during the negative half cycle of the AC ripple in response to the IGBTs 104 and 106. This energy storage device has inductor 112 connected to the junction of IGBT 104 and IGBT 106 and capacitor 114 connected between the inductor 112 and D.C. bus link 18b. The values of the inductor 112 and the capacitor 114 are determined in accordance with the amount of power that the storage unit must be able to absorb and deliver to DC bus 18 and by the maximum ripple current desired to flow at the IGBT switching frequency. In the preferred embodiment the inductor 112 is 10 microhenries while the capacitor is 100 microfarads.

During the positive half cycle of the AC ripple, gate driver 100 turns on IGBT 104 to allow energy to be stored in inductor 112 to absorb this positive half cycle. When transistor 104 is turned off, the energy stored in inductor 112 is transferred to capacitor 114. During the negative half cycle, gate driver 100 turns IGBT 106 on to allow the energy stored in capacitor 114 to transfer to inductor 112. When transistor 106 is gated off, the energy in inductor 112 is added to the DC bus to counter the negative half-cycle of the AC ripple. Accordingly, the AC ripple appearing on the bus 18 caused by a known AC frequency power source will thus be substantially eliminated by the operation of the power converter control unit 42 in conjunction with the power converter 20 as set forth hereinabove.

In FIG. 3, a second embodiment of the invention is shown. This embodiment is capable of eliminating from the DC bus two AC ripple signals of known frequencies. The embodiment shown in FIG. 3 provides two channels each of which functions identically to the embodiment shown in FIG. 2 except that each channel responds to a different AC ripple frequency. The first channel has components substantially as shown in FIG. 2 so that similar components have been designated with like numbers. Specifically the first channel comprises the quadrature generator 60 receiving on line 40 a reference synchronization signal having a frequency equal to the first AC ripple signal on the DC bus. It also includes multipliers 64 and 66, integrators 76, 78 and multipliers 84, 86 all of which act identically to those like numbered components described in the embodiment of FIG. 2. Summer 92, connected to the end of the first channel likewise operates as previously described.

The second channel of the embodiment shown in FIG. 3, substantially parallels the first channel having similarly operating components labeled 100 greater than the corresponding component of the first channel. This channel comprises a second quadrature generator 160 which receives from line 140 an additional reference synchronization signal which is equal in frequency to the second AC ripple on the DC bus. The quadrature generator 160 produces the in-phase and phase quadrature components of the additional reference synchronization signal. These components are output onto lines 162a and 162b, respectively. The voltage sensed between the DC bus links 18a, 18b by voltage sensor 68 is input into the second channel through line 70 into multipliers 164 and 166.

Similar to the first channel, the second channel includes two paths. The first path begins with multiplier 164 which multiplies the voltage produced by voltage sensor 68 and the in-phase component of the additional reference synchronization signal existing on line 162a. Integrator 176 integrates the output of multiplier 164 so as to eliminate AC components. The output of the integrator 176 produced on line 180 reflects the amplitude and phase of the additional AC ripple signal appearing on DC bus 18. Multiplier 184 then multiplies the signal on line 180 by the in-phase component of the additional reference synchronization signal. This product appears on line 188.

Likewise, the second path of the second channel begins with multiplier 166 which multiplies the phase quadrature component of the additional reference synchronization signal on line 162b by the voltage produced by voltage sensor 68. Integrator 178 integrates the output of multiplier 166 producing, on line 182, a signal reflecting the amplitude and phase of the second AC ripple signal appearing on DC bus 18. Multiplier 186 multiplies the signal on line 182 by the phase quadrature component of the additional reference synchronization signal, outputing the product onto line 190. Summer 192 sums the signals existing on lines 188 and 190 producing on line 146 an AC waveform equal in frequency, amplitude and phase to the second AC ripple signal existing on the DC bus 18.

The components existing on lines 88 and 90 and on lines 188 and 190 respectively, when summed together in summers 92 and 192, respectively, produce signals on lines 46 and 146. Summer 150 then sums the signals existing on lines 46 and 146 to produce on line 155 a single control signal having two frequency components which is used as the input to the gate driver 100. This control signal is actually a signal that corresponds to the two ripple on the DC bus, which is in fact, an inverted version of the actual ripple on the DC bus produced by the first and second AC ripple signals on the DC bus. It should be noted that the summers 92, 192 and 150 can all be replaced with a single summer accepting as its inputs the signals on lines 88, 90, 188 and 190 producing its output on line 155.

Gate driver 100 uses the multiple frequency control signal on line 155 to control the IGBTs 104, 106 which in turn regulate the operation of the inductor 112 in series with the capacitor 114 such that the first and second AC ripple signals are eliminated from DC bus 18.

The gate driver 100, IGBTs 104 and 106, diodes 108 and 110, inductor 112 and capacitor 114 all act in substantially the same manner as described in the embodiment of FIG. 2. Thus, the gate driver 100 uses the signal output by summer 150 to produce switching control signals on lines 102a and 102b which control the IGBTs 104 and 106 respectively, such that IGBTs 104 and 106 switch on and off to allow power to flow between the DC bus 18 and the inductor 112 connected in series with the capacitor 114. Diodes 108 and 110 act to provide a conduction path while the current is flowing in the reverse direction relative to the IGBTs, short circuit flow path. It should also be noted that voltage sensor 68 operates in substantially the same manner as the voltage sensor 68 described in the preferred embodiment of FIG. 2.

Thus with the addition of the second channel in this embodiment, two AC ripple signals having different frequencies, yet coexisting on the DC bus 18, can be eliminated in substantially real time.

It should be noted that additional channels comprising quadrature generators and two sets of multipliers, integrators and multipliers can be added to the configuration of FIG. 3 so as to eliminate other AC ripple signals that are produced on the DC bus 18. The outputs of these channels need merely be summed to the signal existing on line 155 which would then be used as an input to the gate driver 100. With the addition of further channels, this invention has the ability to act as an active notch filter for numerous AC ripple signals coexisting on a bus where such AC ripple signals have different frequencies that are not necessarily harmonically related.

Figure 5:
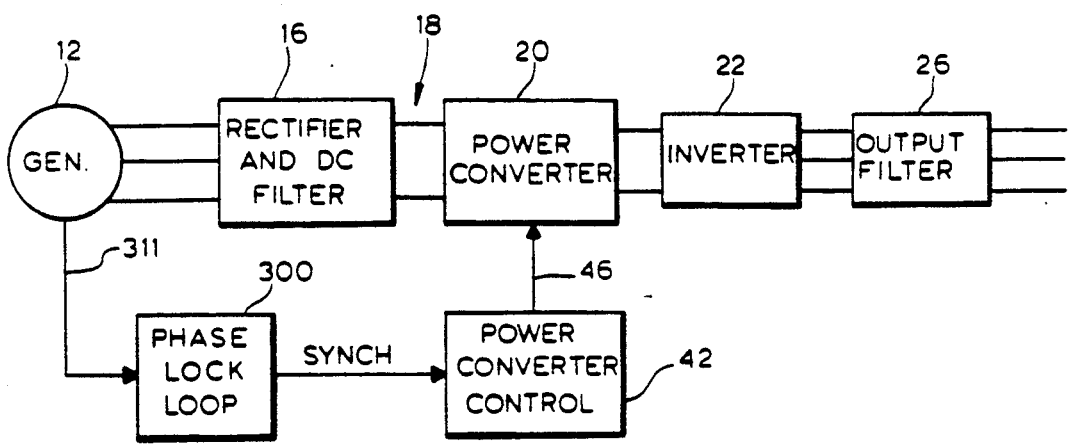
FIG. 5 is a block diagram of an embodiment of the present invention configured to eliminate source-generated AC ripple signals.

FIGS. 4 and 5 show embodiments of the present invention configured with a phase lock loop (PLL) 300 connected so as to sense an AC ripple within the VSCF system and generate the synchronous signal used to control the power converter control 42. Specifically, FIG. 4 shows an embodiment of the invention used in a VSCF system to eliminate load induced ripple, particularly where the frequency of the load induced ripple is unknown and/or varies. A generator 12 is connected to rectifier 16 which produces a DC signal on DC bus 18. Power converter 20 is connected across the links of DC bus 18 and operates substantially as hereinbefore described in conjunction with FIG. 1. DC loads, which may include an inverter, for example, are connected directly to the system through DC bus 18. This embodiment is specifically configured to eliminate AC ripple caused by certain loads such as pulsating radar loads. The advantage of this embodiment can be seen by the operation of the PLL 300 which senses the AC ripple current on the DC bus 18 via current sensor 310 and line 311 and produces at its output a synch signal indicative of the frequency of the AC ripple to be eliminated from the DC bus 18. This synch signal is supplied to the power converter control 42 which operates as hereinafter described to produce a control signal on line 46. This control signal in turn drives the power converter 20 to operate substantially as described in connection with FIG. 1.

FIG. 5 shows an embodiment of the invention used in a VSCF system to eliminate generator produced ripple signals. Generator 12 is connected to a rectifier 16 which provides a substantially DC signal on DC bus 18. Power converter 20 is connected across the DC bus 18 and controls the input to the invertor 22 which feeds output filter 26 so as to provide a three-phase AC signal to AC loads. The generator 12, rectifier 16, power converter 20, invertor 22 and output filter 26 all operate substantially as disclosed in connection with FIG. 1. In FIG. 5, PLL 300 uses a signal from generator 12 over line 311 to produce at its output a synch signal indicative of the AC ripple to be eliminated from the DC bus 18. Line 311 may be appropriately connected to the generator 12 so that the signal carried on line 311 represents the output frequency of generator 12. Thus, line 311 can be connected from any of the generator's output lines to neutral. This synch signal is fed into the power converter control 42 which produces a control signal on line 46 to drive the power converter 20.

With reference to FIG. 6, the operation of the PLL 300 in conjunction with the multiple channel power converter control 42 shown in FIGS. 4 and 5 will be hereinafter described in detail. PLL 300 receives a current signal containing the AC ripple that is to be eliminated on its input line 311. This current signal is generated by either the current sensor 310 connected to the DC bus 18 shown in FIG. 4 or the generator 12 shown in FIG. 5. The DC component of this signal is eliminated in high pass filter 314. The output of high pass filter 314 is then converted to a square wave by threshold circuit 316 the output of which is fed into timer 318 and phase detector 320.

As is typical in phase lock loop systems, phase detector 320 compares the phase of the signal produced by the threshold circuit 316 (which represents the AC ripple) with a loop feedback signal derived from a voltage controlled oscillator (VCO) 324 to produce at its output an error signal indicative of the phase difference between its two input signals. The output of the phase detector 320 is fed into integrator 322 which eliminates low frequency signals and enhances the signal to a desired amplitude level. The output of the integrator 322 is a voltage which controls the VCO oscillator 324 which in turn adjusts the frequency of its output so as to reduce the phase difference detected by phase detector 320.

Connected to the output of VCO 324 are M+1 dividers, where M is the number of single frequency AC ripple signals to be eliminated from the DC bus 18. M also corresponds to the number of channels to be used in the multiple channel power converter control 42.

The value of each specific divider is chosen according to the specific harmonic of AC ripple on the DC bus 18 that is desired to be suppressed. FIG. 6 shows a configuration wherein the value of M is 4 having a divide by $N_1$ divider 326, a divide by $N_2$ divider 328, a divide by $N_3$ divider 330 and a divide by $N_4$ divider 332 all connected in a parallel arrangement. The output of the dividers 326, 328, 330 and 332 are connected to D/A converters 336, 338, 340 and 342, respectively. The D/A converters 336, 338, 340, 342 produce substantially triangular waveforms having frequencies corresponding to the frequencies desired to be eliminated from the DC bus 18.

A final divide by N divider 334 is connected serially between divider 332 and the phase detector 320. Divide by N divider 334 returns the oscillating signal produced by VCO 324 to substantially the fundamental frequency of the AC ripple on line 311. This enables the phase detector 320 to accurately compare the phase of the signal input on line 311 as conditioned by high pass filter 314 and threshold circuit 316 with the phase of the feedback loop signal to thereby produce an error signal. The value of N represents the resolution at which D/A converters 336, 338, 340 and 342 will sample the outputs of the dividers 326, 328, 330 and 332, respectively.

The dividers 326, 328, 330 and 332 successively divide down the frequency of the VCO 324 output signal by their respective amount. The outputs of these dividers are then converted in D/A converters 336, 338, 340 and 342, respectively, which produce triangular waveforms having frequencies corresponding to the value of the associated divider. Thus, in the embodiment shown in FIG. 6, divider 326 drives D/A converter 336 to produce a triangular waveform at the 7th harmonic of the fundamental frequency of the AC ripple to be eliminated from the DC bus 18. Likewise, dividers 328, 330 and 332 drive D/A converters 338, 340 and 342, respectively, to produce triangular waveforms at the 5th, 3rd and 1st harmonic of the fundamental frequency of the AC ripple to be eliminated from the DC bus 18. The divide by N divider 334 completes the phase lock loop providing a signal to the phase detector 320 that is essentially equal in frequency to the fundamental AC ripple to be eliminated from the DC bus 18. Divider 334 is necessary if the output frequency from divider 332 itself is above the ripple fundamental frequency (even through the output from D/A inverter 342 is at the ripple fundamental frequency). The waveforms produced by the D/A converters are converted to a first sinusoidal shaped signal which is in phase with the waveform and a second sinusoidal shaped signal which is the phase quadrature of the first sinusoidal signal. For example, waveform converter 344 converts the triangular waveform from D/A converter 336 to a sinusoidal signal which is in phase with the triangular waveform. Waveform converter 346 on the other hand converts the triangular waveform from D/A converter to a cosinusoidal signal (i.e., separated in phase from the output of waveform converter 344 by 90°).

Harmonic compensators 401, 402, 403 and 404 receive the sinusoidal and cosinusoidal reference signals produced by their corresponding waveform converters. In response to these signals, the harmonic compensators produce signals that are equal in frequency and related in phase and amplitude to the respective harmonic of the fundamental AC ripple signal to be eliminated from the DC bus. The outputs of the harmonic compensators 401, 402, 403 and 404 are combined in summer 400 to produce a single control signal on line 46 for controlling power converter 20 (not shown in FIG. 6). Summer 400 has an enable input which produces an updated output on line 46 in accordance with the timing sequence developed by timer 318 of PLL 300. Timer 318 merely delays any input it receives from line 311 by a suitable amount before providing an ENABLE signal to summer 400. This ENABLE signal turns on the circuit shown in FIG. 6 to suppress harmonics on the DC bus. Any suitable apparatus, such as a switch, may be used in place of timer 318 in order to turn on the circuit when its operation is desired.

Harmonic compensators 401, 402, 403 and 404 in conjunction with summer 400 make up the elements of the multiple channel power converter control 42. The harmonic compensators 401, 402, 403 and 404 are all identical and each is identical to power converter control 42 described in connection with FIG. 1 except that the quadrature generator 60 of power converter control 42 is replaced by phase lock loop 300.

At this point, the harmonic compensator 401 operates in an identical manner to the power converter control 42 as described in connection with FIG 1. Thus, multipliers 414 and 416 multiply the sinusoidal and co-sinusoidal inputs by the voltage on the DC bus produced by, for example, voltage sensor 68 (not shown). The output of these multipliers are then integrated in integrators 418 and 420 to eliminate AC components of the signals output by the multipliers 414 and 416. Multipliers 422 and 424 then multiply the outputs of integrators 418, 420, respectively, with the sinusoidal and cosinusoidal waveforms output by waveform converters 410 and 412, respectively. Finally, the outputs of multipliers 422 and 424 are summed in summer 426 to produce a control signal which is equal in frequency and related in phase and amplitude to a harmonic of the undesired AC ripple signal existing on the DC bus.

Figure 7:
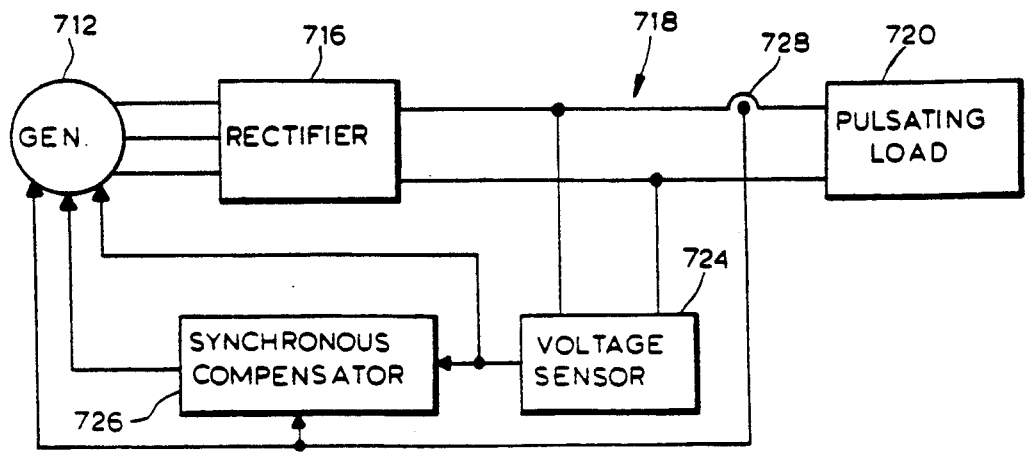
FIG. 7 is a block diagram of an embodiment of the present invention configured to modulate the output of the generator so as to eliminate A.C. ripple signals from a D.C. bus.

Referring now to FIG. 7, an embodiment of the invention is shown which eliminates the need for power converter 20. In this embodiment, generator 712 provides a three-phase variable frequency AC signal to rectifier 716 which produces a substantially DC signal on DC bus 718. A pulsating DC load 720 is connected directly to the DC bus 718. Voltage sensor 724 is connected between the links of the DC bus 718 and provides its output to a synchronous compensator 726 and to the voltage regulator (not shown) of generator 712. A current sense 728 is connected to DC bus 718 to provide a signal indicative of the current on DC bus 718 to the synchronous compensator 726 and to the voltage regulator of generator 712.

The synchronous compensator 726 which comprises a phase lock loop and power converter control as described in connection with FIG. 6, provides its output to the voltage regulator of generator 712. In this embodiment the output of the synchronous compensator 726 along with the voltage and current signals produced by voltage sensor 724 and current sense 728 respectively, are used to control the voltage regulator of generator 712 such that the generator 712 output is modulated thereby eliminating AC ripple appearing on DC bus 718 without the need of the power converter 20.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A circuit for suppressing an AC ripple superimposed upon a bus signal on a bus, said AC ripple having an amplitude, a frequency, and a phase, said circuit comprising:

first means for developing first and second signals, each having substantially the same frequency as said AC ripple, said second signal being the phase quadrature of said first signal;

second means coupled to said first means and said bus for deriving a third signal from said first and second signals, said third signal being related in frequency and phase to the AC ripple; and third means coupled between said second means and said bus for modulating the bus signal to suppress said AC ripple on said bus in response to said third signal.

2. The circuit of claim 1 wherein said second means comprises fourth and fifth means for generating corresponding fourth and fifth signals from said first and second signals, respectively, and from said AC ripple, said fourth and fifth signals being related in amplitude and phase to said AC ripple, and wherein said second means further comprises a summer coupled to said fourth and fifth means for summing said fourth and fifth signals to produce said third signal.

3. The circuit of claim 2 wherein said fourth and fifth means comprise corresponding first and second multipliers coupled to said first means for multiplying said first and second signals, respectively, by a sixth signal representing said AC ripple to obtain respective first and second multiplied signals, first and second conditioning circuits coupled to said first and second multipliers, respectively, for removing AC components from said first and second multiplied signals, and third and fourth multipliers coupled to said first and second conditioning circuits respectively for multiplying said conditioned first and second multiplied signals by said first and second signals, respectively, to produce said fourth and fifth signals.

4. The circuit of claim 3 wherein said bus signal is DC and wherein said circuit further includes an invertor connected to said bus for inverting said DC on said DC bus to AC.

5. The circuit of claim 1 wherein said bus comprises a DC link having a pair of link conductors, and wherein said third means comprises a pair of controllable switches connected together in series across said link conductors, control means for controlling said pair of controllable switches in response to said third signal, and energy storage means coupled to a junction between said pair of controllable switches for alternately absorbing energy from and delivering energy to the bus in response to said pair of controllable switches.

6. The circuit of claim 5 wherein said energy storage means comprises an inductor coupled to said junction and a capacitor coupled to said inductor.

7. The circuit of claim 6 wherein said second means comprises fourth and fifth means for generating corresponding fourth and fifth signals from said first and second signals, respectively, and from said AC ripple, said fourth and fifth signals being related in amplitude and phase to said AC ripple, and wherein said second means further comprises a summer coupled to said fourth and fifth means for summing said fourth and fifth signals to produce said third signal.

8. The circuit of claim 7 wherein said fourth and fifth means comprise corresponding first and second multipliers coupled to said first means for multiplying said first and second signals, respectively, by a sixth signal representing said AC ripple to obtain respective first and second multiplied signals, first and second conditioning circuits coupled to said first and second multipliers, respectively, for removing AC components from said first and second multiplied signals, and third and fourth multipliers coupled to said first and second conditioning circuits respectively for multiplying said conditioned first and second multiplied signals by said first and second signals, respectively, to produce said fourth and fifth signals.

9. The circuit of claim 8 wherein said bus signal is DC and wherein said circuit further includes an invertor connected to said bus for inverting said DC on said DC bus to AC.

10. The circuit of claim 1 wherein said first means comprises signal developing means connected to said bus and responsive to said AC ripple for generating said first and second signals.

11. The circuit of claim 10 wherein said signal developing means comprises phase lock loop means for providing a loop feedback signal having a frequency substantially equal to the frequency of the AC ripple, said phase lock loop means including phase detector means for providing a voltage representing a difference in phase between said loop feedback signal and said AC ripple and voltage to frequency converter means responsive to said voltage for providing said loop feedback signal and said first and second signals.

12. The circuit of claim 11 wherein said second means comprises fourth and fifth means for generating corresponding fourth and fifth signals from said first and second signals, respectively, and from said AC ripple, said fourth and fifth signals being related in amplitude and phase to said AC ripple, and wherein said second means further comprises a summer coupled to said fourth and fifth means for summing said fourth and fifth signals to produce said third signal.

13. The circuit of claim 12 wherein said fourth and fifth means comprise corresponding first and second multipliers coupled to said first means for multiplying said first and second signals, respectively, by a sixth signal representing said AC ripple to obtain respective first and second multiplied signals, first and second conditioning circuits coupled to said first and second multipliers, respectively, for removing AC components from said first and second multiplied signals, and third and fourth multipliers coupled to said first and second conditioning circuits respectively for multiplying said conditioned first and second multiplied signals by said first and second signals, respectively, to produce said fourth and fifth signals.

14. The circuit of claim 13 wherein said bus comprises a DC link having a pair of link conductors, and wherein said third means comprises a pair of controllable switches connected together in series across said link conductors, control means for controlling said pair of controllable switches in response to said third signal, and energy storage means coupled to a junction between said pair of controllable switches for alternately absorbing energy from and delivering energy to the bus in response to said pair of controllable switches.

15. The circuit of claim 14 wherein said energy storage means comprises an inductor coupled to said junction and a capacitor coupled to said inductor.

16. The circuit of claim 15 wherein said bus signal is DC and wherein said circuit further includes an invertor connected to said bus for inverting said DC on said DC bus to AC.

17. A circuit for suppressing first and second AC ripple components superimposed upon a bus signal on a bus, said first and second AC ripple components having corresponding first and second amplitudes, first and second frequencies, and first and second phases, said circuit comprising:

first and second channels developing respective first and second channel output signals, said first and second channel output signals being related in frequency and phase to said corresponding first and second AC ripple components;

first means coupled to said first and second channels for combining said first and second channel output signals to obtain a control signal; and second means coupled to said bus and to said first means for suppressing said first and second AC ripple components on said bus in response to said control signal.

18. The circuit of claim 17 wherein said first channel comprises first quadrature means for supplying a first reference signal and a first quadrature reference signal which is the phase quadrature of said first reference signal, first signal processing means coupled to said first quadrature means and to said bus for providing a first signal based upon said first reference signal and said first AC ripple component, second signal processing means coupled to said first quadrature means and to said bus for providing a second signal based upon said first quadrature reference signal and said first AC ripple component, and first combining means coupled to said first and second processing means for providing said first channel output signal based upon said first and second signals, and said second channel comprises second quadrature means for supplying a second reference signal and a second quadrature reference signal which is the phase quadrature of said second reference signal, third signal processing means coupled to said second quadrature means and to said bus for providing a third signal based upon said second reference signal and said second AC ripple component, fourth signal processing means coupled to said second quadrature means and to said bus for providing a fourth signal based upon said second quadrature reference signal and said second AC ripple component, and second combining means coupled to said third and fourth processing means for providing said second channel output signal based upon said third and fourth signals.

19. The circuit of claim 18 wherein said first signal processing means comprises first multiplier means for multiplying said first reference signal by said first and second AC ripple components superimposed upon said bus signal to obtain a first multiplied signal, first conditioning means coupled to said first multiplier means for removing AC components from said first multiplied signal, and second multiplier means for multiplying said conditioned first multiplied signal by said first reference signal to obtain said first signal, said second signal processing means comprises third multiplier means for multiplying said first quadrature reference signal by said first and second AC ripple components superimposed upon said bus signal to obtain a second multiplied signal, second conditioning means coupled to said third multiplier means for removing AC components from said second multiplied signal, and fourth multiplier means for multiplying said conditioned second multiplied signal by said first quadrature reference signal to obtain said second signal, said third signal processing means comprises fifth multiplier means for multiplying said second reference signal by said first and second AC ripple components superimposed upon said bus signal to obtain a third multiplied signal, third conditioning means coupled to said fifth multiplier means for removing AC components from said third multiplied signal, and sixth multiplier means for multiplying said conditioned third multiplied signal by said first reference signal to obtain said third signal, and said fourth signal processing means comprises seventh multiplier means for multiplying said second quadrature reference signal by said first and second AC ripple components superimposed upon said bus signal to obtain a fourth multiplied signal, fourth conditioning means coupled to said seventh multiplier means for removing AC components from said fourth multiplied signal, and eighth multiplier means for multiplying said conditioned fourth multiplied signal by said second quadrature reference signal to obtain said fourth signal.

20. The circuit of claim 19 wherein said bus signal is DC and wherein said circuit further includes an inverter connected to said bus for inverting said DC on said DC bus to AC.

21. The circuit of claim 17 wherein said bus comprises a DC link having a pair of link conductors and wherein said second means comprises a pair of controllable switches connected together in series across said link conductors, control means for controlling said pair of controllable switches in response to said control signal, and energy storage means coupled to a junction between said pair of controllable switches for alternately absorbing energy from and delivering energy to the bus in response to said pair of controllable switches.

22. The circuit of claim 21 wherein said energy storage means comprises an inductor coupled to said junction and a capacitor coupled to said inductor.

23. The circuit of claim 22 wherein said first channel comprises first quadrature means for supplying a first reference signal and a first quadrature reference signal which is the phase quadrature of said first reference signal, first signal processing means coupled to said first quadrature means and to said bus for providing a first signal based upon said first reference signal and said first AC ripple component, second signal processing means coupled to said first quadrature means and to said bus for providing a second signal based upon said first quadrature reference signal and said first AC ripple component, and first combining means coupled to said first and second processing means for providing said first channel output signal based upon said first and second signals, and said second channel comprises second quadrature means for supplying a second reference signal and a second quadrature reference signal which is the phase quadrature of said second reference signal, third signal processing means coupled to said second quadrature means and to said bus for providing a third signal based upon said second reference signal and said second AC ripple component, fourth signal processing means coupled to said second quadrature means and to said bus for providing a fourth signal based upon said second quadrature reference signal and said second AC ripple component, and second combining means coupled to said third and fourth processing means for providing said second channel output signal based upon said third and fourth signals.

24. The circuit of claim 23 wherein said first signal processing means comprises first multiplier means for multiplying said first reference signal by said first and second AC ripple components superimposed upon said bus signal to obtain a first multiplied signal, first conditioning means coupled to said first multiplier means for removing AC components from said first multiplied signal, and second multiplier means for multiplying said conditioned first multiplied signal by said first reference signal to obtain said first signal, said second signal processing means comprises third multiplier means for multiplying said first quadrature reference signal by said first and second AC ripple components superimposed upon said bus signal to obtain a second multiplied signal, second conditioning means coupled to said third multiplier means for removing AC components from said second multiplied signal, and fourth multiplier means for multiplying said conditioned second multiplied signal by said first quadrature reference signal to obtain said second signal, said third signal processing means comprises fifth multiplier means for multiplying said second reference signal by said first and second AC ripple components superimposed upon said bus signal to obtain a third multiplied signal, third conditioning means coupled to said fifth multiplier means for removing AC components from said third multiplied signal, and sixth multiplier means for multiplying said conditioned third multiplied signal by said first reference signal to obtain said third signal, and said fourth signal processing means comprises seventh multiplier means for multiplying said second quadrature reference signal by said first and second AC ripple components superimposed upon said bus signal to obtain a fourth multiplied signal, fourth conditioning means coupled to said seventh multiplier means for removing AC components from said fourth multiplied signal, and eighth multiplier means for multiplying said conditioned fourth multiplied signal by said second quadrature reference signal to obtain said fourth signal.

25. The circuit of claim 24 wherein said bus signal is DC and wherein said circuit further includes an inverter connected to said bus for inverting said DC on said DC bus to AC.

26. The circuit of claim 17 wherein said first and second channels comprise signal developing means connected to said bus and responsive to said AC ripple for providing first and second reference signals and first and second quadrature reference signals, said first and second quadrature reference signals being phase quadratures of said respective first and second reference signals.

27. The circuit of claim 26 wherein said signal developing means comprises phase lock loop means for providing a loop feedback signal having a frequency substantially equal to the frequency of the AC ripple, said phase lock loop means including phase detector means for providing a voltage representing a difference in phase between said loop feedback signal and said AC ripple and voltage to frequency converter means responsive to said voltage for providing said loop feedback signal and for providing said first and second reference signals and said first and second quadrature reference signals, said first reference signal and said first quadrature reference signal being related in phase and frequency to said first AC ripple component and said second reference signal and said second quadrature reference signal being related in phase and frequency to said second AC ripple component.

28. The circuit of claim 27 wherein said first channel comprises first signal processing means coupled to said phase lock loop means and to said bus for providing a first signal based upon said first reference signal and said first AC ripple component, second signal processing means coupled to said phase lock loop means and to said bus for providing a second signal based upon said first quadrature reference signal and said first AC ripple component, and first combining means coupled to said first and second processing means for providing said first channel output signal based upon said first and second signals, and said second channel comprises third signal processing means coupled to said phase lock loop means and to said bus for providing a third signal based upon said second reference signal and said second AC ripple component, fourth signal processing means coupled to said phase lock loop means and to said bus for providing a fourth signal based upon said second quadrature reference signal and said second AC ripple component, and second combining means coupled to said third and fourth processing means for providing said second channel output signal based upon said third and fourth signals.

29. The circuit of claim 28 wherein said first signal processing means comprises first multiplier means for multiplying said first reference signal by said first and second AC ripple components superimposed upon said bus signal to obtain a first multiplied signal, first conditioning means coupled to said first multiplier means for removing AC components from said first multiplied signal, and second multiplier means for multiplying said conditioned first multiplied signal by said first reference signal to obtain said first signal, said second signal processing means comprises third multiplier means for multiplying said first quadrature reference signal by said first and second AC ripple components superimposed upon said bus signal to obtain a second multiplied signal, second conditioning means coupled to said third multiplier means for removing AC components from said second multiplied signal, and fourth multiplier means for multiplying said conditioned second multiplied signal by said first quadrature reference signal to obtain said second signal, said third signal processing means comprises fifth multiplier means for multiplying said second reference signal by said first and second AC ripple components superimposed upon said bus signal to obtain a third multiplied signal, third conditioning means coupled to said fifth multiplier means for removing AC components from said third multiplied signal, and sixth multiplier means for multiplying said conditioned third multiplied signal by said first reference signal to obtain said third signal, and said fourth signal processing means comprises seventh multiplier means for multiplying said second quadrature reference signal by said first and second AC ripple components superimposed upon said bus signal to obtain a fourth multiplied signal, fourth conditioning means coupled to said seventh multiplier means for removing AC components from said fourth multiplied signal, and eighth multiplier means for multiplying said conditioned fourth multiplied signal by said second quadrature reference signal to obtain said fourth signal.

30. The circuit of claim 29 wherein said bus comprises a DC link having a pair of link conductors and wherein said second means comprises a pair of controllable switches connected together in series across said link conductors, control means for controlling said pair of controllable switches in response to said control signal, and energy storage means coupled to a junction between said pair of controllable switches for alternately absorbing energy from and delivering energy to the bus in response to said pair of controllable switches.

31. The circuit of claim 30 wherein said energy storage means comprises an inductor coupled to said junction and a capacitor coupled to said inductor.

32. The circuit of claim 31 wherein said bus signal is DC and wherein said circuit further includes an invertor connected to said bus for inverting said DC on said DC bus in order to provide an AC output.

33. The circuit of claim 1 wherein the third means alternately absorbs energy from and delivers energy to the bus to suppress the AC ripple on said bus.

34. A circuit for suppressing an AC ripple superimposed upon a DC bus signal on a bus coupled to an inverter, said AC ripple having an amplitude, a frequency, and a phase, said circuit comprising:
   first means for developing first and second signals, each having substantially the same frequency as same AC ripple, said second signal being the phase quadrature of said first signal;
   second means coupled to said first means and said bus for deriving a third signal from said first and second signals, said third signal being related in frequency and phase to the AC ripple; and
   third means coupled to said second means and to said bus for suppressing said AC ripple on said bus in response to said third signal.

35. The circuit of claim 34 wherein the third means alternately absorbs energy from and delivers energy to the bus to suppress the AC ripple on said bus.

36. The circuit of claim 34 wherein said bus comprises a DC link having a pair of link conductors, and wherein said third means comprises a pair of controllable switches connected together in series across said link conductors, control means for controlling said pair of controllable switches in response to said third signal, and energy storage means coupled to a junction between said pair of controllable switches for alternately absorbing energy from and delivering energy to the bus in response to said pair of controllable switches.

* * * * *